(12) United States Patent
Loh et al.

(10) Patent No.: US 8,267,655 B2
(45) Date of Patent: Sep. 18, 2012

(54) METHOD FOR CONTROLLING A WIND TURBINE, AND WIND TURBINE ARRANGEMENT

(75) Inventors: Friedrich Loh, Schuettorf (DE); Hartmut Scholte-Wassink, Lage (DE); Till Hoffmann, Osnabrueck (DE); Juergen Esser, Bevergern (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/973,466

(22) Filed: Dec. 20, 2010

(65) Prior Publication Data
US 2011/0268569 A1 Nov. 3, 2011

(51) Int. Cl.
*F03D 7/04* (2006.01)
(52) U.S. Cl. ............... 416/44; 416/61; 416/146 R; 416/1
(58) Field of Classification Search ............... 416/1, 44, 416/61, 146 R
See application file for complete search history.

(56) References Cited

U.S. PATENT DOCUMENTS

| 7,551,130 | B2 * | 6/2009 | Altenschulte | 342/357.4 |
| 7,883,316 | B2 * | 2/2011 | Kildegaard | 416/1 |
| 2010/0021298 | A1 * | 1/2010 | Sandvad | 416/1 |
| 2010/0143129 | A1 * | 6/2010 | Fisher | 416/61 |

FOREIGN PATENT DOCUMENTS
EP 1 764 627 A1 6/2011

OTHER PUBLICATIONS

Take, Sopan, "RFID Technology" Article found on Buzzle.com, Apr. 26, 2004, http://www.buzzle.com/editorials/4-26-2004-5391.asp.
"What is BLADE?", Ashtech Technology, Article updated Dec. 2010, http://www.ashtech.com/what-is-blade--2172.kjsp?RH=1272644205746&RF=ASHTECH_TECHNOLOGY.

* cited by examiner

*Primary Examiner* — Ninh H Nguyen
(74) *Attorney, Agent, or Firm* — Global Patent Operation; Douglas D. Zhang (57) ABSTRACT

The present disclosure relates to a method for controlling a wind turbine, the wind turbine including at least one movable portion which is movable during operation of the wind turbine and at least one movable portion device including at least one of a movable portion transmitter or a movable portion receiver, the movable portion transmitter or the movable portion receiver being disposed at the least one movable portion; the method including: at least one of sending to or receiving from at least three reference points at least one signal by at least one of the movable portion transmitter or movable portion receiver; and determining at least one operational parameter of the wind turbine depending on at least one characteristic of the at least one received signal. Further the present disclosure relates to a wind turbine arrangement and a system for controlling a wind turbine, comprising a controller of the wind turbine and a movable portion.

19 Claims, 6 Drawing Sheets

METHOD FOR CONTROLLING A WIND TURBINE, AND WIND TURBINE ARRANGEMENT

BACKGROUND OF THE INVENTION

The subject matter described herein relates to methods and systems for operating a wind turbine and a wind turbine arrangement, and more particularly, to methods and systems for determining at least one position of at least one movable portion of the wind turbine.

At least some known wind turbines include a tower and a nacelle mounted on the tower. A rotor is rotatably mounted to the nacelle and is coupled to a generator by a shaft. A plurality of blades extend from the rotor. The blades are oriented such that wind passing over the blades turns the rotor and rotates the shaft, thereby driving the generator to generate electricity.

Operational parameters like rotor speed, rotor position, blade bending or deflection and tower bending or deflection are used to control a wind turbine. Usually, all of these parameters are provided by customized sensors. Examples of sensors include: strain gauges, incremental encoders, absolute encoders, and acceleration sensors, and are used to measure the rotor speed, rotor position, blade bending or deflection, tower bending or deflection, tower acceleration, main shaft bending and blade angle. Some of these sensors are sensitive, cost intensive or unreliable.

Many different sensors are used to provide certain operational parameters for the wind turbine control system, for example rotational speed, tower bending, shaft bending, and blade pitch. This increases the costs of each single sensor, and for different sensors different failure detection algorithms or devices may be used. Extensive engineering effort is required to specify, design and implement these sensors. It is desirable to provide a more reliable and cheaper method or arrangement to determine the operational parameters of the wind turbine.

BRIEF DESCRIPTION OF THE INVENTION

In one aspect, a method for controlling a wind turbine is provided. The wind turbine includes at least one movable portion which is movable during operation of the wind turbine and at least one movable portion device including at least one of a movable portion transmitter or a movable portion receiver. The movable portion transmitter or the movable portion receiver are disposed at the least one movable portion. The method includes: at least one of sending to or receiving from at least three reference points at least one signal by at least one of the movable portion transmitter or movable portion receiver; and determining at least one operational parameter of the wind turbine depending on at least one characteristic of the at least one received signal.

In another aspect, a wind turbine arrangement is provided. The wind turbine arrangement includes at least one wind turbine including a movable portion that is movable during operation of the wind turbine; at least one movable portion device. The at least one movable portion device includes a movable portion transmitter or movable portion receiver adapted to at least one of sending to or receiving from to at least three reference points at least one signal. The movable portion transmitter or movable portion receiver is arranged at the movable portion. At least one first controller adapted to determine an operational parameter of the wind turbine depending on at least one characteristic of the at least one received signal.

In yet another aspect, a system for controlling a wind turbine is provided. The system comprises a controller of the wind turbine and movable portion of a wind turbine adapted to be movable during operation of the wind turbine. The movable portion includes at least one position determination device including a movable portion transmitter or movable portion receiver adapted to at least one of sending or receiving at least one signal. The position determination device is adapted to determine a position of the movable portion of the wind turbine depending on at least one characteristic of the at least one signal, and is adapted to send the position to the controller of the wind turbine.

Further aspects, advantages and features of the present invention are apparent from the dependent claims, the description and the accompanying drawings.

BRIEF DESCRIPTION OF THE DRAWINGS

A full and enabling disclosure, including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

The embodiments described herein include a wind turbine system in which the operational parameters may be determined reliably. More specifically, only one type of device may be used to determine the operational parameters. Operational parameters may be parameters used to control the operation of the wind turbine.

As used herein, the term "blade" is intended to be representative of any device that provides a reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power.

Figure 1:
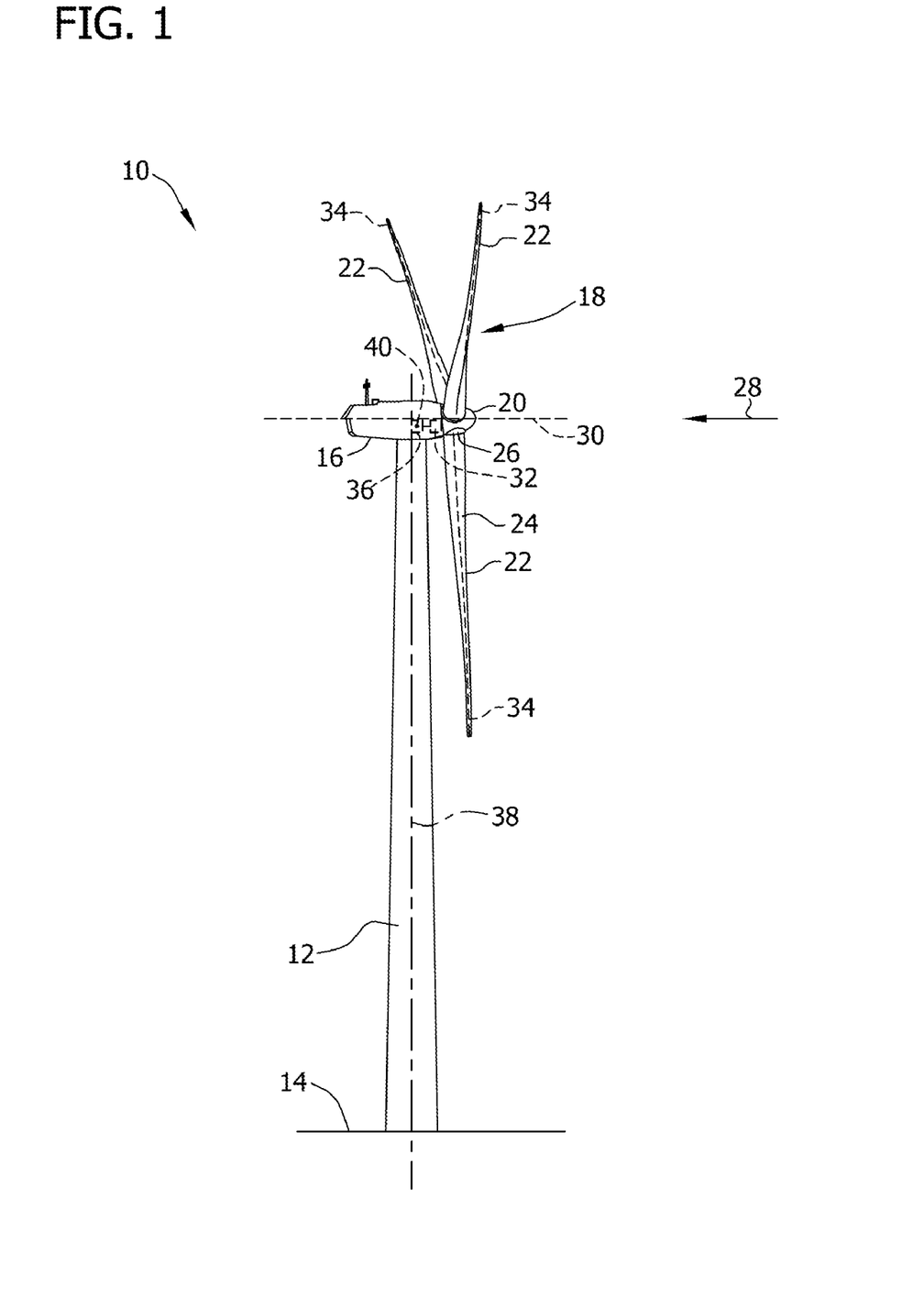
FIG. 1 is a perspective view of an exemplary wind turbine.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a support system 14, a nacelle 16 mounted on tower 12, and a rotor 18 that is coupled to nacelle 16. Rotor 18 includes a rotatable hub 20 and at least one rotor blade 22 coupled to and extending outward from hub 20. In the exemplary embodiment, rotor 18 has three rotor blades 22. In an alternative embodiment, rotor 18 has more or less than three rotor blades 22. In the exemplary embodiment, tower 12 is fabricated from tubular steel to define a cavity (not shown in FIG. 1) between support system 14 and nacelle 16. In an alternative embodiment, tower 12 is any suitable type of tower having any suitable height.

Rotor blades 22 are spaced about hub 20 to facilitate rotating rotor 18 to enable kinetic energy to be transferred from the wind into usable mechanical energy and, subsequently, electrical energy. Rotor blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to rotor blades 22 are transferred to hub 20 via load transfer regions 26.

In one embodiment, rotor blades 22 have a length ranging from about 15 meters (m) to about 91 m. Alternatively, rotor blades 22 may have any suitable length that enables wind turbine 10 to function as described herein. For example, other non-limiting examples of blade lengths include 10 m or less, 20 m, 37 m, or a length that is greater than 91 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position.

Moreover, a pitch angle or blade pitch of rotor blades 22, i.e., an angle that determines a perspective of rotor blades 22 with respect to direction 28 of the wind, may be changed by a pitch adjustment system 32 to control the load and power generated by wind turbine 10 by adjusting an angular position of at least one rotor blade 22 relative to wind vectors. Pitch axes 34 for rotor blades 22 are shown. During operation of wind turbine 10, pitch adjustment system 32 may change a blade pitch of rotor blades 22 such that rotor blades 22 are moved to a feathered position, such that the perspective of at least one rotor blade 22 relative to wind vectors provides a minimal surface area of rotor blade 22 to be oriented towards the wind vectors, which facilitates reducing a rotational speed of rotor 18 and/or facilitates a stall of rotor 18.

In the exemplary embodiment, a blade pitch of each rotor blade 22 is controlled individually by a control system 36. Alternatively, the blade pitch for all rotor blades 22 may be controlled simultaneously by control system 36. Further, in the exemplary embodiment, as direction 28 changes, a yaw direction of nacelle 16 may be controlled about a yaw axis 38 to position rotor blades 22 with respect to direction 28.

In the exemplary embodiment, control system 36 is shown as being centralized within nacelle 16, however, control system 36 may be a distributed system throughout wind turbine 10, on support system 14, within a wind farm, and/or at a remote control center. Control system 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

In the embodiments described herein, memory may include, without limitation, a computer-readable medium, such as a random-access memory (RAM), and/or a computer-readable non-volatile medium, such as flash memory. Alternatively, a floppy disk, a compact-disc read-only memory (CD-ROM), a magneto-optical disk (MOD), and/or a digital versatile disc (DVD) may also be used. Also, in the embodiments described herein, input channels include, without limitation, sensors and/or computer peripherals associated with an operator interface, such as a mouse and a keyboard. Further, in the exemplary embodiment, output channels may include, without limitation, a control device, an operator interface monitor and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a programmable logic controller (PLC) cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, wind turbine control system control commands. The execution of sequences of instructions is not limited to any specific combination of hardware circuitry and software instructions.

Figure 2:
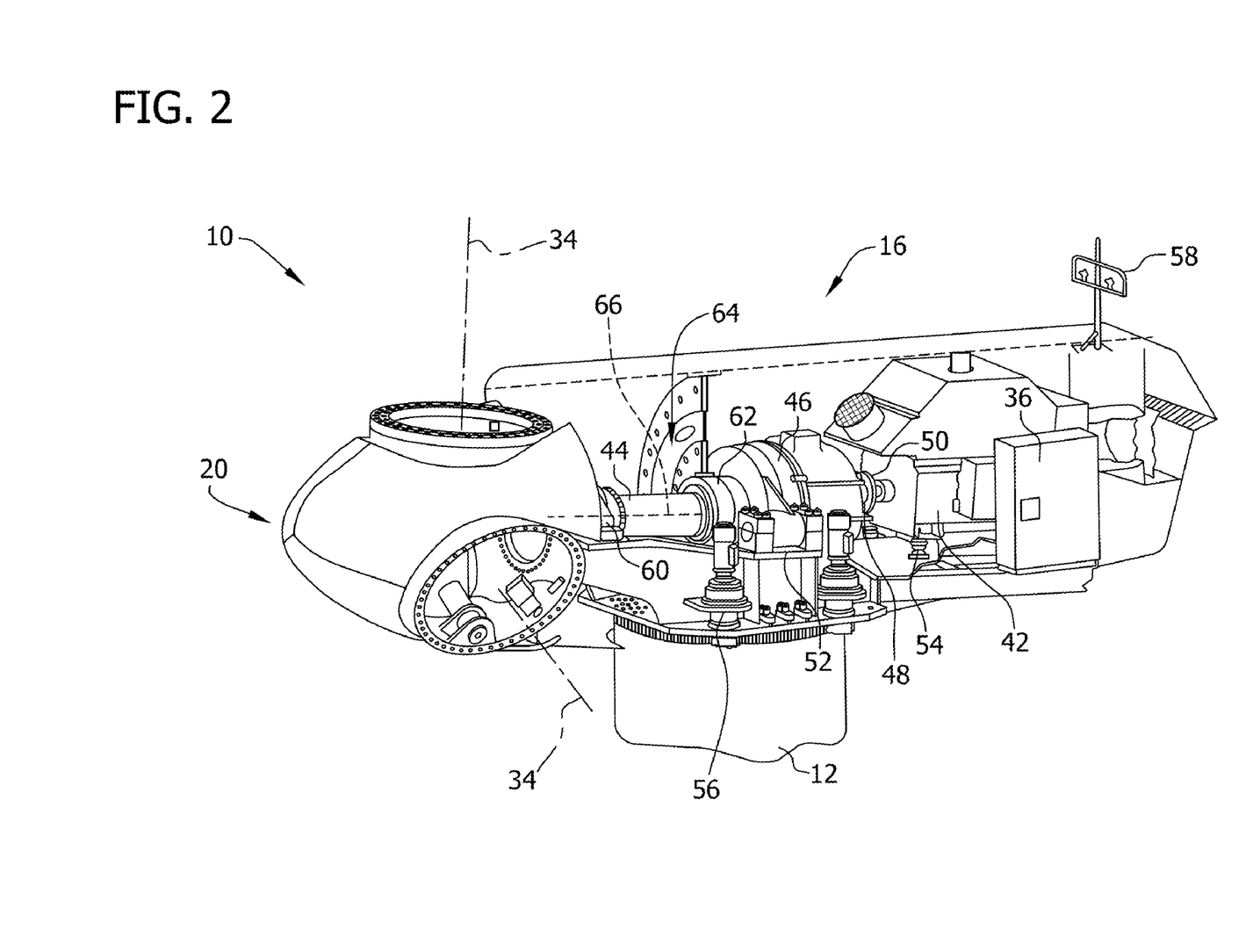
FIG. 2 is an enlarged section view of a portion of the wind turbine shown in FIG. 1.

FIG. 2 is an enlarged sectional view of a portion of wind turbine 10. In the exemplary embodiment, wind turbine 10 includes nacelle 16 and hub 20 that is rotatably coupled to nacelle 16. More specifically, hub 20 is rotatably coupled to an electric generator 42 positioned within nacelle 16 by rotor shaft 44 (sometimes referred to as either a main shaft or a low-speed shaft), a gearbox 46, a high-speed shaft 48, and a coupling 50. In the exemplary embodiment, rotor shaft 44 is disposed coaxial to longitudinal axis 66. Rotation of rotor shaft 44 rotatably drives gearbox 46 that subsequently drives high-speed shaft 48. High-speed shaft 48 rotatably drives generator 42 with coupling 50 and rotation of high-speed shaft 48 facilitates production of electrical power by generator 42. Gearbox 46 and generator 42 are supported by a support 52 and a support 54. In the exemplary embodiment, gearbox 46 utilizes a dual path geometry to drive high speed shaft 48. Alternatively, rotor shaft 44 is coupled directly to generator 42 with coupling 50.

Nacelle 16 also includes a yaw drive mechanism 56 that may be used to rotate nacelle 16 and hub 20 on yaw axis 38 (shown in FIG. 1) to control the perspective of rotor blades 22 with respect to direction 28 of the wind. Nacelle 16 also includes at least one meteorological mast 58 that includes a wind vane and anemometer (neither shown in FIG. 2). Mast 58 provides information to control system 36 that may include wind direction and/or wind speed. In the exemplary embodiment, nacelle 16 also includes a main forward support bearing 60 and a main aft support bearing 62.

Forward support bearing 60 and aft support bearing 62 facilitate radial support and alignment of rotor shaft 44. Forward support bearing 60 is coupled to rotor shaft 44 near hub 20. Aft support bearing 62 is positioned on rotor shaft 44 near gearbox 46 and/or generator 42. Alternatively, nacelle 16 includes any number of support bearings that enable wind turbine 10 to function as disclosed herein. Rotor shaft 44, generator 42, gearbox 46, high speed shaft 48, coupling 50, and any associated fastening, support, and/or securing device including, but not limited to, support 52 and/or support 54, and forward support bearing 60 and aft support bearing 62, are sometimes referred to as a drive train 64.

Figure 3:
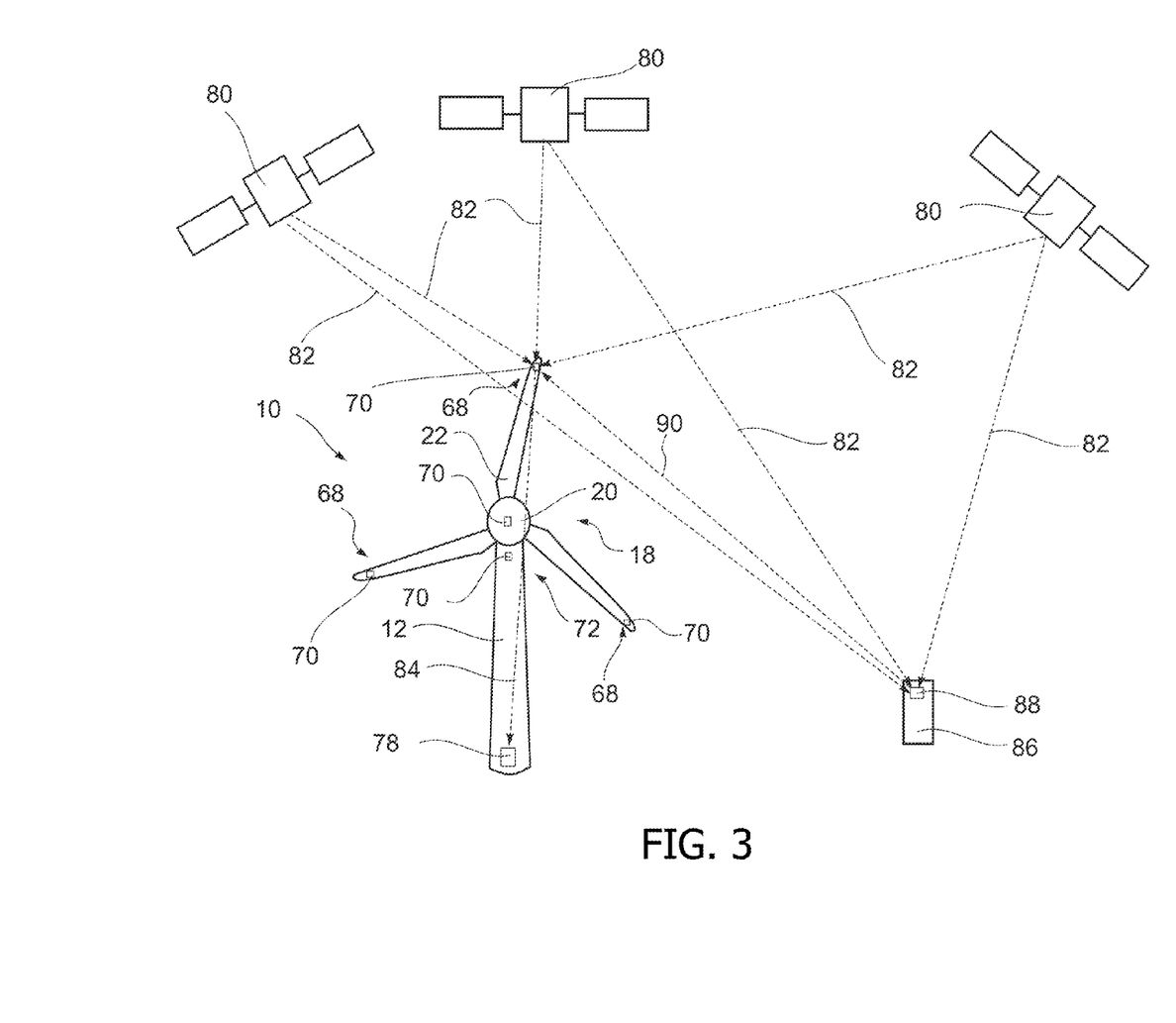
FIG. 3 is a schematical view of a wind turbine arrangement according to embodiments described.
Figure 4:
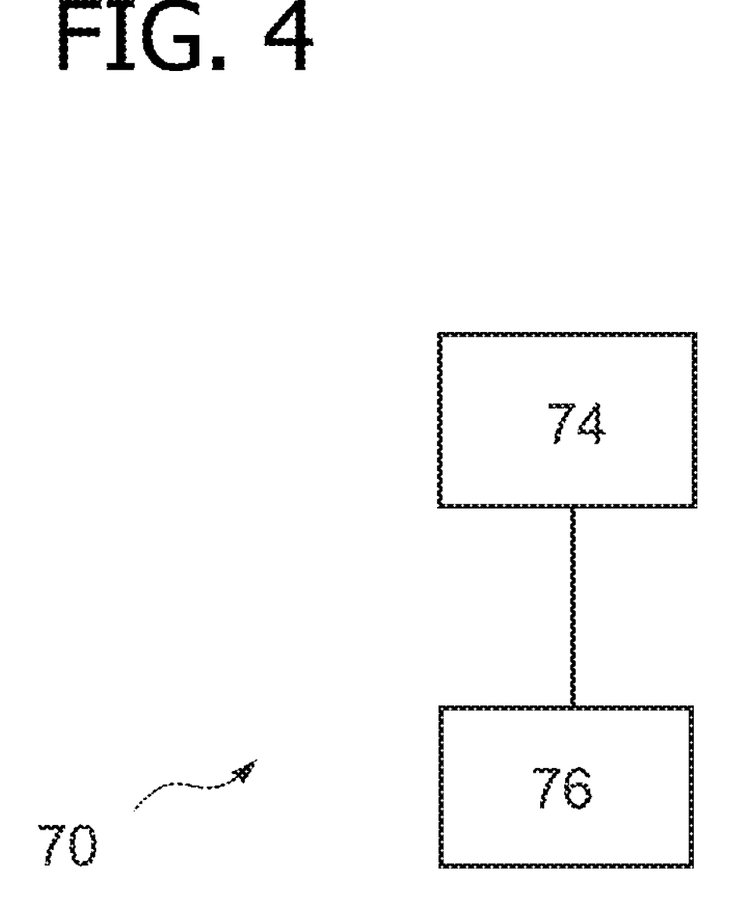
FIG. 4 shows schematically a position determination device.

FIG. 3 shows schematically an embodiment of an arrangement for determining operational parameters of the wind turbine. The arrangement includes the wind turbine 10 having the wind rotor 18. The wind rotor includes the hub 20, three rotor blades 22. In other embodiments, the wind rotor may also include more or less rotor blades 22. Each blade has a blade tip 68. A position determination device 70 is arranged in each blade tip 68. Further, a position determination device 70 may be disposed in the hub, on or in the rotor shaft 44, on the high speed shaft 48, in the nacelle 16, and/or at a top end 72 of the tower. In FIG. 4 the position determination device is shown in more detail. The position determination device includes a controller 74 for determining the position and a transceiver 76 for receiving and sending electromagnetic signals. In other embodiments, the position determination device may include a separate receiver and transmitter or may include only a receiver. The signals may be transmitted via a wire connection to a wind turbine controller 78. Similar to the control system 36 described above, the controller 78 may also be a distributed system or arranged outside the wind turbine 10.

In an embodiment, which may be combined with other embodiments disclosed herein, the transceiver 76 is adapted for receiving electromagnetic signals from satellites 80 of a global navigation satellite system. For example, the global navigation satellite system may be GPS (Global Positioning System), GLONASS (Russian global navigation system), GALILEO (planned European global navigation system). Each satellite 80 sends an electromagnetic satellite signal 82 that is received by the transceiver 76 and the position determination device 70 may calculate its position by trilateration, using the running time or time of flight between the satellites 80 and the transceiver 76. As only the position of the transceiver 76 or receiver is relevant for the calculation of the position, the controller 74 may placed away from the transceiver 76.

The position may be sent via an electromagnetic signal 84 to the wind turbine controller 78. For example, the wind turbine controller 78 may be located in the tower of the wind turbine. In other embodiments, the wind turbine controller 78 may be located outside the tower of the wind turbine. The wind turbine controller 78 may, for example, using the position and/or the change of the position during time calculate operational parameters of the wind turbine which may be used for operating the wind turbine, for example a rotation of the wind rotor, an azimuth angle of the wind rotor, a pitch of the rotor blade, a bending of the rotor blade, a bending of the rotor shaft, and/or a bending of the tower. The position may also be calculated in the wind turbine controller 78. Then, the position determination device 70 forwards the information or characteristics of the electromagnetic satellite signal 82 that may be used for the calculation of the position of the transceiver 76, and thus the blade tip 68.

The wind turbine arrangement may include a reference station 86, which has a known fixed position on the earth and also includes a transceiver 88 and a controller connected to the transceiver. The reference station is adapted for receiving electromagnetic satellite signals 82 from the satellites 80 of the global navigation satellite system. The reference station 86 calculates the difference between its known position and the position calculated based on the electromagnetic satellite signals 82 and sends this difference, or a correction signal 90 containing information how to correct the position, to the position determination devices 70. In embodiments, which may be combined with other embodiments disclosed herein, the correction signal may also be sent to the wind turbine controller 78. With the information of the correction signal 90, the position determination device or the wind turbine controller may increase accuracy of the position of the transceiver 76 of the position determination devices 70. For example, the wind turbine arrangement may use a DGPS (Differential Global Positioning System). In some embodiments, which may be combined with other embodiments disclosed herein, the reference station may be located in the base of the tower of the wind turbine or of a wind turbine of a wind farm.

A local-area DGPS may be used, which may provide a millimeter level resolution with measurements that are ambiguous to about 19 cm. More than one, for example two or more, base stations or reference stations may be used. At least two, for example three or more, wind turbines in a wind farm may include a sender for a differential signal.

Depending on the terrain and the communication system, a manual site calibration or an automated calibration may be applied to determine the position and height of each receiver installed in a tower base.

In some embodiments, which may be combined with other embodiments disclosed herein, the position determination devices 70 may use the running time of electromagnetic signals from mobile phone networks to calculate a distance to known positions of base stations of the mobile phone network to the transceiver 76. With a trilateration the position of the transceiver of the position determination devices 70 may be then determined and sent to the controller 78 of the wind turbine 10.

The transceiver 76 of the position determination devices 70 may be disposed in a movable portion of the wind turbine that is movable during operation of the wind turbine 10, for example the top 72 of the tower 12 or the rotor blade tips 68. The controller 74 of the position determination device 70, wherein the controller 74 is adapted to calculate the position of the portion of the wind turbine, may be placed away from the portion of the wind turbine, for example, in the controller or close to the wind turbine controller 78 of the wind turbine.

Figure 5:
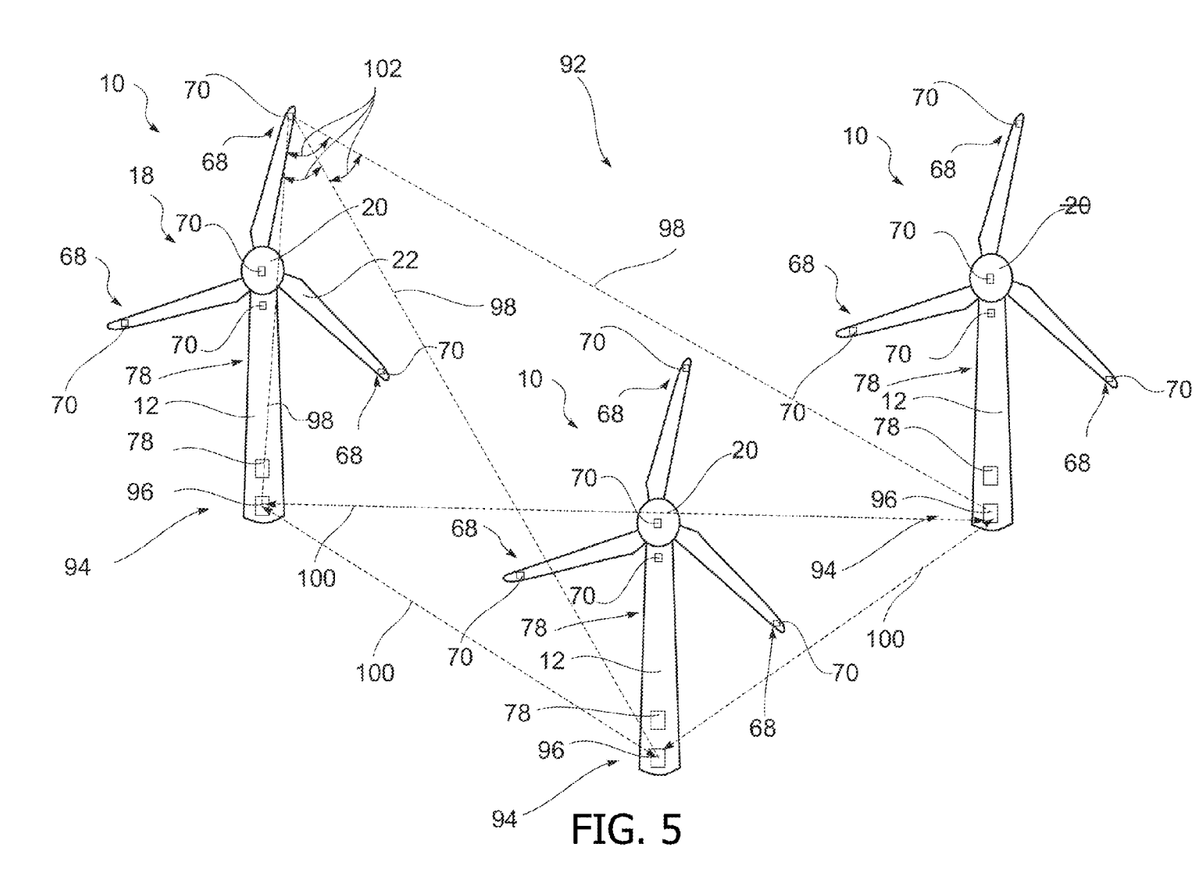
FIG. 5 is a schematical drawing of a wind turbine arrangement according to embodiments disclosed herein.

FIG. 5 shows an embodiment of an arrangement for determining the position of movable portions of a wind turbine 10. For the sake of simplicity, the same reference numbers as in the previous drawings are used. However, some features provided for determining the position may have different functions compared to the embodiments described above. The arrangement may be integrated in a wind farm. The wind farm 92 includes a plurality of wind turbines 10, each having a tower 12 and a wind rotor 18. The wind rotor 18 has a hub 20 and rotor blades 22. Each wind turbine 10 includes movable portions, for example the hub 20, the blade tip 68, the nacelle and/or the top end 72 of the tower 12. The actual position of the movable portions may be used to control the wind turbines.

A position determination device 70 is arranged at the blade tips 220, the hub 20 and the tower top 72. In an embodiment, a RFID (Radio Frequency Identification) tag may be used as a position determination device. The position determination devices 70 include a transceiver 76 for receiving electromagnetic signals. Further, each tower base 94 includes a transmitter 96 for sending electromagnetic signals 98 to the position determination devices 70. Based on the running time, time of flight or reception time of the electromagnetic signal between the transmitter 96 in the tower base 94 and the transceiver of the positioning determination devices 70, the distance between the transmitter 96 and the transceiver of the position determination device 70 may be determined. With at least three transmitters 96 and using trilateration, the exact position of the transceivers 76 of the position determination devices 70 may be determined by the position determination devices. The determined position and/or the running time may be sent to a controller 78 of the wind turbine, such that the wind turbine may be controlled based on the position of the portions of the wind turbine.

In embodiments, which may be combined with other embodiments disclosed herein, position determination devices may be located in the tower base and the transmitters may be located in the movable portions of the wind turbine. A round-trip time may be used to determine the position of the movable portions of the wind turbine. For example a signal is sent by a transceiver in the tower base, received by a transceiver in the movable portion of the wind turbine, for example an RFID tag in a movable portion of the wind turbine, and a return electromagnetic signal is immediately resent back by the transceiver in the movable portion to the transceiver. The distance may be calculated from the time between sending of the electromagnetic signal of the transceiver in the tower base and receiving the return electromagnetic signal. With RFID, depending on the frequency range, a resolution of less than 1 cm is possible. In some embodiments, the RFID tag may be located in the tower base 94, and the movable portions may include a transmitter/receiver for energizing the RFID chip.

In the exemplary embodiment, wind turbine controller for controlling the wind turbine may be a real-time controller that includes any suitable processor-based or microprocessor-based system, such as a computer system, that includes microcontrollers, reduced instruction set circuits (RISC), application-specific integrated circuits (ASICs), logic circuits, and/or any other circuit or processor that is capable of executing the functions described herein. In one embodiment, controller 78 may be a microprocessor that includes read-only memory (ROM) and/or random access memory (RAM), such as, for example, a 32 bit microcomputer with 2 Mbit ROM, and 64 Kbit RAM. As used herein, the term "real-time" refers to outcomes occurring a substantially short period of time after a change in the inputs affect the outcome, with the time period being a design parameter that may be selected based on the importance of the outcome and/or the capability of the system processing the inputs to generate the outcome.

In embodiments of the disclosure, the parameters used for controlling the wind turbine are calculated by the position of the blade tips and the hub cone center in relation to the tower base. In some embodiments, which may be combined with other embodiments disclosed herein, further parameters such as the shaft bending and/or an azimuth position of the nacelle are calculated from the positions of the blade tips. In embodiments, the positions could be determined by local-area differential GPS, radio, for example radio frequency identification (RFID), ultrasonic or others.

Depending on the signal transmission type, the references or reference points of, for example, two wind turbines may be taken into account. The calculation may be performed in several ways:

For example, trilateration may be used. In this case, the duration, or the timeofflight, of a signal transmission is taken into account, in particular to determining the distance between the reference points and the object, whose position may be calculated, for example the movable portion of the wind turbine, the blade tip, the hub cone center, and/or the top of the tower. In this case the geometry of spheres or triangles is used. Typically, trilateration is used for GPS. In this case, the transmitter located in the satellites 80 sends the signals to be received by the position determination device 70 located in the movable portion. When the signal is received by the position determination device 70, the position determination 70 device may include only a receiver instead of the transceiver 76. The calculation may then be performed by the position determination device 70. In other embodiments, the signal is sent by the position determination device 70 and is received by a receiver or transceiver located in the tower bases. Then, the position determination device may use a transmitter instead of a transceiver 76. The calculation of the position or the operational parameter may be performed by a controller located in one of the tower bases 94, by the wind turbine controller 78, or by a controller of receivers placed at the positions of the transmitters 96 shown in FIG. 5. When using trilateration, the signal 82, 98 may contain a time stamp. For trilateration, the wind turbine arrangement may include a plurality of reference stations 86 connected to the ground in addition to or instead of the tower bases.

Further, triangulation may be used. In triangulation, the location of an object, for example the movable portion of the wind turbine, is determined by measuring the angles to it from known reference points at either end of a fixed baseline. The baselines between the turbines, for example the distance between the tower bases, and at least two angles may be measured, for example with receiver antenna diversity and phase comparison. The base line may be, with reference to FIG. 5, the distance 100 between towers of the wind turbines. In other embodiments, the baseline may be the distance between the transceivers of the known reference points. For example, the distance may be determined electronically, by sending an electromagnetic signal between the reference points. Further, at least two angles 102 between the signals from the known reference points may be determined. When the signal is received by the position determination device 70, the position determination 70 device may include only a receiver instead of the transceiver 76. The calculation may then be performed by the position determination device 70. In other embodiments, the signal is sent by the position determination device 70 and is received by a receiver or transceiver located in the tower bases. Then, the position determination device may use a transmitter instead of a transceiver 76. The calculation of the position or the operational parameter may be performed by a controller located in one of the tower bases 94, by the wind turbine controller 78, or by a controller of receivers placed at the positions of the transmitters 96 shown in FIG. 5. For triangulation, the wind turbine arrangement may include a plurality of reference stations 86 connected to the ground in addition to or instead of the tower bases of other wind turbines.

As another option, multilateration may be used. In this case, the time difference of an arrival at three or more receivers of a signal emitted by the object to be positioned, for example the movable portion of the wind turbine such as the rotor blade tip, is calculated. Also, the time difference of signals sent from at least three synchronised transmitters to the object to be positioned, here the movable portions of the wind turbine 10, may be used. The transmitters may be disposed in the tower bases 94 or at the reference points 86 of a wind turbine arrangement. Multilateration is also known as hyperbolic positioning.

Further, a combination of multilateration, triangulation, and/or trilateration may be used, where the signal is sent by the reference points 86 and/or by the position determination device 70.

In the case of a wind farm, it can occur that sometimes the wind acts in a direction where some turbines are in a row. While the first turbine would be subjected to the largest loads, the loads are reduced for those behind. In this case the control algorithms may also use the operational parameters to distribute the loads between the turbines. For example, the wind turbines may communicate between each other, or to a central control device, the state of the other wind turbines, such that a single wind turbine is operated at the optimal working point or the wind farm is operated at the optimal conditions.

In some embodiments, the accuracy may allow for calculating further parameters such as tower acceleration, main shaft bending, and blade angle.

Figure 6:
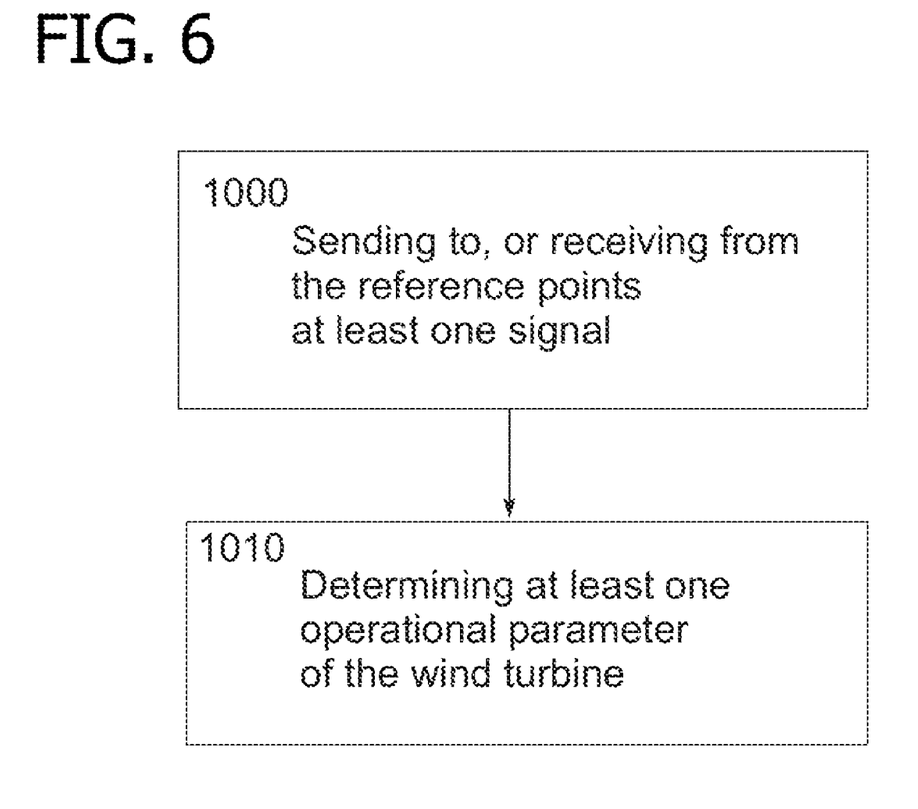
FIG. 6 is a schematical flow chart according to an embodiment of a method.

FIG. 6 shows schematically a flow chart of a method according to an embodiment. Typically, a wind turbine may include a movable portion that is movable during operation of the wind turbine. In the movable portion, a position determination device may be arranged, which includes a movable portion transmitter and/or a movable portion receiver. In box 1000, a signal is sent from the position determination device to the reference points. In a further embodiment, a signal sent from the reference points is received by the position determination. For example, the reference points may be satellites of a global navigation satellite system or reference points at a fixed location on the earth. The received signal, received by either the position determination device or the reference points, has at least one characteristic.

The characteristic of a signal may provide information about relative position of the movable portion with respect to a reference point, for example to determine the distance between the movable portion and the reference point. With the characteristics of at least one signal with respect to at least three reference points, the position of the movable portion or the operational parameter can be determined. The characteristic of the signal may be, for example, the round-trip time, the time of flight, the reception time, the reception angle, which may be used for determining the position of the movable portion or, more precisely, the position of the movable portion transmitter or the movable portion receiver.

In Box 1010, from the characteristic of the signal, at least one operational parameter of the wind turbine may be determined. In particular, for the determination of the operational parameters or the position of the movable portion, either the at least one signal is sent by the position determination device, then the angle, the time-of-flight, or the time of arrival is determined at the reference points, or a signal is sent from each reference point to the position determination device. In further embodiments, a combination of both possibilities may be used.

The above-described systems and methods facilitate the design of a wind turbine. More specifically, reliability is enhanced. Thus, only one type of sender or transmitter may be used to provide several different parameters. These senders or transmitters may send their positions to a receiver. Depending on the transmission signal type, a controller would calculate one or more operational parameter using either trilateration, multilateration and/or triangulation.

The wind turbine is simplified, and the costs are reduced by incorporating only one transmitter type and one receiver type instead of several different sensor types. Further, effort required to maintain the arrangement is reduced, or in some cases, removed completely. Instead of using several different sensors, only one type of transmitter/receiver could be used to send their position to a controller using several different signals.

According to an embodiment, the method according to an embodiment herein may further include determining a position of the at least one movable portion depending on the at least one characteristic of the at least one signal; and determining the at least one operational parameter depending on the position of the at least one movable portion.

According to an embodiment, the method according to an embodiment herein may further include providing or sending the at least one position of the at least one movable portion or the operational parameter to a control device of the wind turbine.

In some embodiments, the position is determined and sent by the movable portion device.

For example, in an embodiment, which may be combined with other embodiments disclosed herein, at least three of the at least three reference points are selected from a group consisting of satellites of a global navigation satellite system, and earth-connected reference points being fixed to the earth.

Typically, in embodiments, at least one of the at least three reference points is located in at least one of the wind turbine or another wind turbine. For example all reference points may be located in a wind turbine of a wind farm.

In an embodiment, which may be combined with other embodiments disclosed herein, the at least one characteristic is at least one of the following: a respective running time between the movable portion receiver or transmitter and the at least three reference points, a round trip time between the movable portion receiver or transmitter and the at least three reference points, at least two signal angles between signals between the movable portion receiver or transmitter and the at least three reference points, and a time of arrival of the at least one signal between the movable portion receiver or transmitter and the at least three reference points. The characteristic may depend on the method used for determining the operational parameter of the wind turbine or the position of the movable portion.

In embodiments, the at least one signal for determining the at least one characteristic is received by the movable portion receiver. Alternatively or additionally the at least one signal is received at receiver at at least one of the at least three reference points.

For example, in embodiments, the operational parameter is determined by using at least one of triangulation, multilateration, or trilateration using the at least one characteristic of the at least one signal. The signal may be adapted to the process used for determining the operational parameter of the wind turbine or the position of the movable portion. For example, the signal may include a time stamp.

In embodiments, the signal is at least one of the following: an electromagnetic signal and an ultrasonic signal. Thus, the position or the operational parameter may be determined wireless. The frequency and or the location of the reference points may depend to the signal type used.

For example, in some embodiments, which may be combined with other embodiments disclosed herein, the movable portion device is a RFID tag. In other embodiments, also the reference points may include RFID tags.

For example, in embodiments, which may be combined with other embodiments disclosed herein, the at least one operational parameter is at least one of the following: a rotational speed of a wind rotor, a rotational speed of a generator rotor, a bending of the rotor shaft, a bending of a tower of the wind turbine, the bending of a rotor blade, an azimuth position, and a pitch of a rotor blade.

In an embodiment, which may be combined with other embodiments disclosed herein, the at least one movable portion is at least one of the following: a rotor blade tip, a portion of a rotor shaft, a portion of a tower of the wind turbine, a portion of a nacelle of the wind turbine, a portion of a hub of the wind turbine, and a base of the tower of the wind turbine.

In embodiments, a method according to an embodiment disclosed herein, may further include: operating the wind turbine depending on the at least one operational parameter.

In embodiments, the wind turbine according to an embodiment disclosed herein, may include at least one second controller adapted to determine the position of the at least one movable portion depending on at least one characteristic of the at least one signal; wherein the at least one first controller is adapted to determine at least one operational parameter of the wind turbine depending on the position.

For example, in embodiments, the at least one of the at least one first controller or the at least one second controller is respectively arranged at the movable portion.

In embodiments, the at least one first control device or the at least one second control device are integrated in the same control unit.

Exemplary embodiments of systems and methods for controlling a wind turbine are described above in detail. The systems and methods are not limited to the specific embodiments described herein, but rather, components of the systems and/or steps of the methods may be utilized independently and separately from other components and/or steps described herein. For example, the arrangement for determining the operational parameters of a wind turbine are not limited to practice with only the wind turbine systems as described herein. Rather, the exemplary embodiment can be implemented and utilized in connection with many other rotor blade applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for controlling a wind turbine, wherein the wind turbine comprises at least one movable portion which is movable during operation of the wind turbine and at least one movable portion device including at least one of a movable portion transmitter and a movable portion receiver, the movable portion transmitter or the movable portion receiver being disposed at the at least one movable portion, wherein the method comprises:

at least one of sending to or receiving from at least three reference points at least one signal by respective at least one of the movable portion transmitter and the movable portion receiver;

determining, by a first controller, at least one operational parameter of the wind turbine depending on at least one characteristic of the at least one signal; and determining, by a second controller, a position of the at least one movable portion depending on the at least one characteristic of the at least one signal, wherein at least one of the first controller and the second controller is arranged at the at least one movable portion.

2. The method according to claim 1, further comprising: determining, by the first controller, the at least one operational parameter depending on the position of the at least one movable portion.

3. The method according to claim 2, further comprising providing or sending the position of the at least one movable portion or the at least one operational parameter to a control device of the wind turbine.

4. The method according to claim 3, wherein the position is sent by the at least one movable portion device.

5. The method according to claim 1, wherein at least three of the at least three reference points are from
satellites of a global navigation satellite system, and earth-connected reference points being fixed to the earth.

6. The method according to claim 1, wherein at least one of the at least three reference points is located in at least one of the wind turbine and another wind turbine.

7. The method according to claim 1, wherein the at least one characteristic is at least one of the following:
a respective running time between the movable portion receiver or transmitter and the at least three reference points;
a round trip time between the movable portion receiver or transmitter and the at least three reference points;
at least two signal angles between signals between the movable portion receiver or transmitter and the at least three reference points; and
a time of arrival of the at least one signal between the movable portion receiver or transmitter and the at least three reference points.

8. The method according to claim 7, wherein the at least one signal for determining the at least one characteristic is received by at least one of the movable portion receiver and a receiver located at least one of the at least three reference points.

9. The method according to claim 1, wherein the at least one operational parameter is determined by using at least one of triangulation, multilateration, and trilateration using the at least one characteristic of the at least one signal.

10. The method according to claim 1, wherein the signal is at least one of the following: an electromagnetic signal, and an ultrasonic signal.

11. The method according to claim 1, wherein the at least one movable portion device is a RFID tag.

12. The method according to claim 1, wherein the at least one operational parameter is at least one of the following:
a rotational speed of a wind rotor, a rotational speed of a generator rotor, a bending of the rotor shaft, a bending of a tower of the wind turbine, the bending of a rotor blade, an azimuth position, and a pitch of a rotor blade.

13. The method according to claim 1, wherein the at least one movable portion is at least one of the following:
a rotor blade tip, a portion of a rotor shaft; a portion of a tower of the wind turbine, a portion of a nacelle of the wind turbine, a portion of a hub of wind turbine, and a base of the tower of the wind turbine.

14. The method according to claim 1, further comprising operating the wind turbine depending on the at least one operational parameter.

15. A wind turbine arrangement comprising:
a wind turbine including a movable portion that is movable during operation of the wind turbine;
at least one movable portion device including a movable portion transmitter or movable portion receiver adapted to at least one of sending to or receiving from at least three reference points at least one signal, wherein the movable portion transmitter or movable portion receiver is arranged at the at least one movable portion;
at least one first controller adapted to determine an operational parameter of the wind turbine depending on at least one characteristic of the at least one signal; and
at least one second controller adapted to determine a position of the at least one movable portion depending on the at least one characteristic of the at least one signal, wherein at least one of the at least one first controller and the at least one second controller is arranged at the at least one movable portion.

16. The wind turbine arrangement according to claim 15, wherein the at least one first controller is adapted to determine at least one operational parameter of the wind turbine depending on the position of the at least one movable portion.

17. The wind turbine arrangement according to claim 15, wherein the at least one characteristic is at least one of the following:
a respective running time between the movable portion receiver or transmitter and the at least three reference points;
a round trip tune between the movable portion receiver or transmitter and the at least three reference points;
at least two signal angles between signals between the movable portion receiver or transmitter and the at least three reference points; and
a time of arrival of the at least one signal between the movable portion receiver or transmitter and the at least three reference points.

18. The wind turbine arrangement according to claim 15, wherein the at least one first controller and the at least one second controller are integrated in the same control unit.

19. A system for controlling a wind turbine, comprising:
a controller of the wind turbine; and
a movable portion of a wind turbine adapted to be movable during operation of the wind turbine, wherein the movable portion comprises at least one position determination device including a movable portion transmitter or a movable portion receiver adapted to at least one of sending or receiving at least one signal, wherein the position determination device is adapted to determine a position of the movable portion of the wind turbine depending on at least one characteristic of the at least one signal, and is adapted to send the position to the controller of the wind turbine.

* * * * *

UNITED STATES PATENT AND TRADEMARK OFFICE
CERTIFICATE OF CORRECTION

| | | |
|---|---|---|
| PATENT NO. | : 8,267,655 B2 | Page 1 of 1 |
| APPLICATION NO. | : 12/973466 | |
| DATED | : September 18, 2012 | |
| INVENTOR(S) | : Friedrich Loh et al. | |

It is certified that error appears in the above-identified patent and that said Letters Patent is hereby corrected as shown below:

In Column 12, Line 13, in Claim 3, delete "comprising" and insert -- comprising: --, therefor.

In Column 12, Line 42, in Claim 8, delete "located at least" and insert -- located at at least --, therefor.

In Column 12, Line 61, in Claim 13, delete "shaft;" and insert -- shaft, --, therefor.

In Column 12, Line 63, in Claim 13, delete "hub of wind" and insert -- hub of the wind --, therefor.

In Column 14, Line 1, in Claim 17, delete "trip tune between" and insert -- trip time between --, therefor.

Signed and Sealed this
Fifteenth Day of January, 2013

David J. Kappos
*Director of the United States Patent and Trademark Office*